United States Patent
Backes

(10) Patent No.: US 9,758,093 B2
(45) Date of Patent: *Sep. 12, 2017

(54) METHOD FOR CONTROLLING AN INTERIOR LIGHTING SYSTEM IN A VEHICLE AND INTERIOR LIGHTING SYSTEM

(71) Applicant: TRW AUTOMOTIVE ELECTRONICS & COMPONENTS GMBH, Radolfzell (DE)

(72) Inventor: Ulrich Backes, Radolfzell (DE)

(73) Assignee: TRW Automotive Electronics & Components GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/402,424

(22) PCT Filed: Jul. 5, 2013

(86) PCT No.: PCT/EP2013/064228
§ 371 (c)(1),
(2) Date: Nov. 20, 2014

(87) PCT Pub. No.: WO2014/009264
PCT Pub. Date: Jan. 16, 2014

(65) Prior Publication Data
US 2015/0224924 A1   Aug. 13, 2015

(30) Foreign Application Priority Data
Jul. 11, 2012   (DE) .................. 10 2012 013 783

(51) Int. Cl.
*B60Q 3/02* (2006.01)
*H05B 37/02* (2006.01)
(Continued)

(52) U.S. Cl.
CPC ............ *B60Q 3/0293* (2013.01); *B60Q 3/16* (2017.02); *B60Q 3/80* (2017.02); *H05B 37/02* (2013.01)

(58) Field of Classification Search
CPC .......... B60K 37/06; G08B 21/00; B60Q 1/00; B60Q 3/0293
See application file for complete search history.

(56) References Cited

U.S. PATENT DOCUMENTS 5,000,566 A * 3/1991 Kuppenheimer, Jr. . G01P 13/02
340/974
5,671,996 A * 9/1997 Bos ........................ B60Q 3/001
362/140

(Continued)

FOREIGN PATENT DOCUMENTS

DE   19822636   1/1999
DE   19745275   4/1999
(Continued)

OTHER PUBLICATIONS

Kim et al., "Improving driver's visual field using estimation of curvature," Year: 2010, pp. 728-731.*

*Primary Examiner* — Tuan C. To
(74) *Attorney, Agent, or Firm* — Tarolli, Sunheim, Covell & Tummino LLP

(57) ABSTRACT

In a method of controlling an interior lighting (25) in a vehicle (18), having a plurality of separately drivable lamps (26a-26g), provision is made that a motion light pattern, in particular a wave light pattern, is generated as a function of vehicle operating data by separately driving the individual lamps (26a-26g), the vehicle operating data including ambient data picked up by means of a light sensor.

20 Claims, 3 Drawing Sheets

(51) Int. Cl.
  *B60Q 3/80*   (2017.01)
  *B60Q 3/16*   (2017.01)

(56) References Cited

U.S. PATENT DOCUMENTS

| | | | | |
|---|---|---|---|---|
| 6,141,432 | A * | 10/2000 | Breed | B60J 10/00 382/100 |
| 6,160,475 | A | 12/2000 | Hornung et al. | |
| 8,294,564 | B1 * | 10/2012 | Smith | G08B 5/36 340/467 |
| 2003/0039124 | A1 * | 2/2003 | Tawa | B60Q 1/10 362/464 |
| 2003/0123705 | A1 * | 7/2003 | Stam | B60Q 1/085 382/104 |
| 2003/0142504 | A1 * | 7/2003 | Mueller | B60H 1/00985 362/488 |
| 2004/0109154 | A1 * | 6/2004 | Wallace | B60R 21/01538 356/4.03 |
| 2004/0178739 | A1 * | 9/2004 | Numajiri | B60Q 1/085 315/82 |
| 2006/9023901 | | 10/2006 | Woo | |
| 2006/0261970 | A1 * | 11/2006 | Colacecchi | B64D 11/00 340/686.1 |
| 2007/0007442 | A1 * | 1/2007 | Wenstrand | G06F 3/03543 250/221 |
| 2007/0109785 | A1 * | 5/2007 | Wittorf | B60Q 3/0293 362/276 |
| 2008/0175012 | A1 * | 7/2008 | Shimaoka | B60Q 1/085 362/464 |
| 2008/0186701 | A1 | 8/2008 | Omi | |
| 2008/0309477 | A1 | 12/2008 | Dakov | |
| 2010/0195336 | A1 * | 8/2010 | Hashemi | F21S 48/115 362/324 |
| 2010/0207530 | A1 | 8/2010 | Maruyama et al. | |
| 2010/0302020 | A1 * | 12/2010 | Lenneman | B60K 35/00 340/441 |
| 2011/0227716 | A1 * | 9/2011 | Lucas | B60Q 3/0293 340/439 |
| 2012/0139415 | A1 | 6/2012 | Lee et al. | |
| 2012/0271511 | A1 * | 10/2012 | Dierks | B60Q 1/143 701/36 |
| 2013/0177202 | A1 * | 7/2013 | Dierks | B60Q 1/143 382/103 |
| 2013/0249395 | A1 * | 9/2013 | Hatakeyama | B60K 35/00 315/77 |
| 2013/0324848 | A1 * | 12/2013 | Kuroki | A61B 5/021 600/438 |
| 2014/0002254 | A1 | 1/2014 | Reuschel et al. | |

FOREIGN PATENT DOCUMENTS

| | | | |
|---|---|---|---|
| DE | 102010003270 | 9/2011 | |
| DE | 102010003273 | 9/2011 | |
| DE | 10 2010 020 566 | 11/2011 | |
| DE | 102010018336 | 1/2012 | |
| DE | 102011014262 | 9/2012 | |
| EP | 1868066 A2 * | 12/2007 | G06F 3/0317 |
| EP | 1 884 408 | 2/2008 | |
| EP | 1946967 | 7/2008 | |
| EP | 2 174 833 | 4/2010 | |
| JP | 2001199261 | 7/2001 | |
| JP | 2003095029 | 4/2003 | |
| JP | 2005193804 | 7/2005 | |
| JP | 2006331040 | 12/2006 | |
| JP | 2011198037 | 10/2011 | |
| JP | 2011252835 A * | 12/2011 | |
| WO | 02090824 | 11/2002 | |

\* cited by examiner

METHOD FOR CONTROLLING AN INTERIOR LIGHTING SYSTEM IN A VEHICLE AND INTERIOR LIGHTING SYSTEM

RELATED APPLICATIONS

This application corresponds to PCT/EP2013/064228, filed Jul. 5, 2013, which claims the benefit of German Application No. 10 2012 013 783,4, filed Jul. 11, 2012, the subject matter, of which are incorporated herein by reference in their entirety.

BACKGROUND OF THE INVENTION

The present invention relates to a method of controlling an interior lighting in a vehicle including a plurality of separately drivable lamps, and to such an interior lighting.

Modern vehicles feature an ever better noise reduction and also better chassis, so that driving noises, for instance wind, rolling or engine noises, are effectively reduced in the vehicle interior. While this increases the driving comfort of the vehicle, it makes it more difficult for the driver of the vehicle to estimate the speed or the acceleration of the vehicle correctly.

While the driver does receive a feedback about the driving condition, for instance about the speed of the vehicle, via the monitoring instruments of the vehicle, for instance via the speed indicator, the driver may be distracted from these monitoring instruments by other indicators and operating elements in the vehicle or by the traffic situation, so that the driver can not perceive a change in speed in time. In addition, especially during long drives in the vehicle, the driver's attention may decrease so that it is difficult for the driver to perceive all the information provided by the monitoring instruments.

SUMMARY OF THE INVENTION

It is the object of the invention to provide a system and a method for allowing the driver to better assess the driving condition of the vehicle.

To achieve the object, provision is made for a method of controlling an interior lighting in a vehicle including a plurality of separately drivable lamps, with a motion light pattern, in particular a wave pattern, being generated as a function of vehicle operating data by separately driving the individual lamps. The basic idea of the invention is to make use of an interior lighting that illuminates the interior of the vehicle indirectly or directly, to inform the driver about various operating conditions of the vehicle, for instance the driving speed. The motion light pattern is generated by driving the lamps separately; here, a luminous period, an off period or luminous pause, and the luminous intensity can be set separately for each lamp. The vehicle operating data includes ambient data picked up by means of a light sensor. Thereby, the ambient brightness can be measured, and the brightness and/or the light pattern of the individual light sources can be controlled accordingly.

The natural motion light pattern can be detected by a sensor and the lamps can be driven such that they are switched on in dark areas and/or switched off in bright areas, as a result of which the changes in brightness are lessened for the driver. This allows strong changes of light, especially in wooded areas, to be damped, so that the driver is not so heavily distracted by the strong changes of light.

In addition, the driver's brain can be stimulated by a corresponding motion light pattern, so that the method according to the invention can prevent or at least delay a tiredness of the driver.

In order to avoid that the vehicle occupant becomes accustomed to this light pattern or in order to simulate a more natural, more irregular course, the period of this light pattern may more particularly have a defined variance, so that the luminous period and/or the off period of the individual lamps is varied within a certain defined range.

To generate such a motion light pattern in the vehicle, preferably all of the lamps are driven with an identical or at least similar light pattern, the lamps being driven with the light pattern offset in time.

A feedback about the driving speed or an acceleration in the longitudinal direction of the vehicle may be given for example by driving the lamps offset in time in the longitudinal direction of the vehicle, in particular in the direction of travel, so that a motion light pattern is generated that runs in the longitudinal direction of the vehicle.

To allow the driver to assess the vehicle speed, the time offset of the lamps is preferably selected such that the motion light pattern moves at the speed of the vehicle contrary to the direction of travel, whereby a motion light pattern is generated that imitates the natural light/shadow change when driving through a wooded area.

To provide a feedback to the driver about a lateral acceleration of the vehicle, for instance in cornering, it is also conceivable for the lamps to be driven offset in time in the transverse direction of the vehicle, so that a motion light pattern is generated that runs in the vehicle transverse direction of the vehicle.

The time offset with which the lamps are driven may be dependent on the driving speed of the vehicle, for example. This time offset can be controlled such that the speed of the motion light pattern in the longitudinal direction of the vehicle or in the transverse direction of the vehicle corresponds to the actual speed of the vehicle in this direction. But it is also conceivable that the time offset is controlled such that the motion light pattern is faster or slower than the actual speed of the vehicle, and in this way too high or too low a speed, for example, is simulated to the driver. By the simulation of too high a speed, for example, the driver can be admonished to reduce the speed.

The time offset with which the lamps are driven may, however, also be dependent on the acceleration of the vehicle in the longitudinal and/or transverse direction, so that the driver receives a feedback about the acceleration of the vehicle. This is of advantage in lateral accelerations, in particular in cornering.

The vehicle operating data may be stored in a memory, so that the respective data can be read out from this memory for different operating conditions of the vehicle. It is conceivable, for instance, that this vehicle operating data is matched against a positioning system such as a GPS, so that for specific distances a defined motion light pattern is stored or predefined which can be retrieved when the vehicle moves through this particular stretch of the road. The vehicle operating data may, for example, also be determined via the positioning system. In addition to the motion light pattern, the light pattern of the individual lamps may also be dependent on the driving speed of the vehicle. At a higher speed, the natural alternations between brightness and darkness occur at correspondingly shorter intervals so that the lamps are driven such that the luminous periods and luminous pauses will be correspondingly shorter.

Accordingly, the light pattern of the individual lamps may also be dependent on the acceleration of the vehicle in the longitudinal direction or in the transverse direction.

To achieve the object, furthermore provision is made for an interior lighting for a vehicle, comprising a lighting device including at least two lamps which can be driven separately, and comprising a controller which can drive the lamps separately. The lamps are driven by a method according to the invention, and at least one sensor is provided for acquiring vehicle operating data.

The interior lighting preferably includes a memory for vehicle-specific data, so as to allow a motion light pattern for a particular driving condition to be retrieved or stored intermediately, by means of which the lamps or the interior lighting can be driven.

Preferably, the lamps are arranged in the longitudinal direction of the vehicle or in the transverse direction of the vehicle, so that based on the lamps being driven offset in time, a feedback about the driving speed or the acceleration of the vehicle is possible.

BRIEF DESCRIPTION OF THE DRAWINGS

Further advantages and features of the invention will be apparent from the description below in conjunction with the accompanying drawings, in which:

FIG. 8 shows a detailed illustration of the method according to the invention for driving a lamp of the interior lighting of FIG. 3.

DESCRIPTION OF EMBODIMENTS

Figure 1:
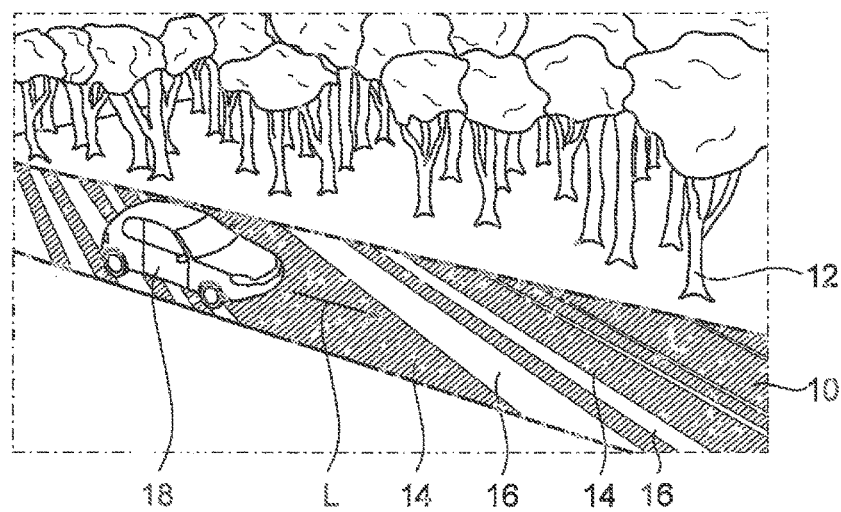
FIG. 1 shows an illustration of a natural light pattern of a vehicle when it travels on a road through a wooded area.

FIG. 1 schematically shows a road 10 which leads through a wooded area 12. The incidence of light creates on the road 10 areas 14 of low brightness or shadow and areas 16 with a direct incidence of light, i.e. of high brightness. A vehicle 18 that travels on the road 10 in a direction L of motion, passes through these dark and bright areas 14, 16.

Figure 2:
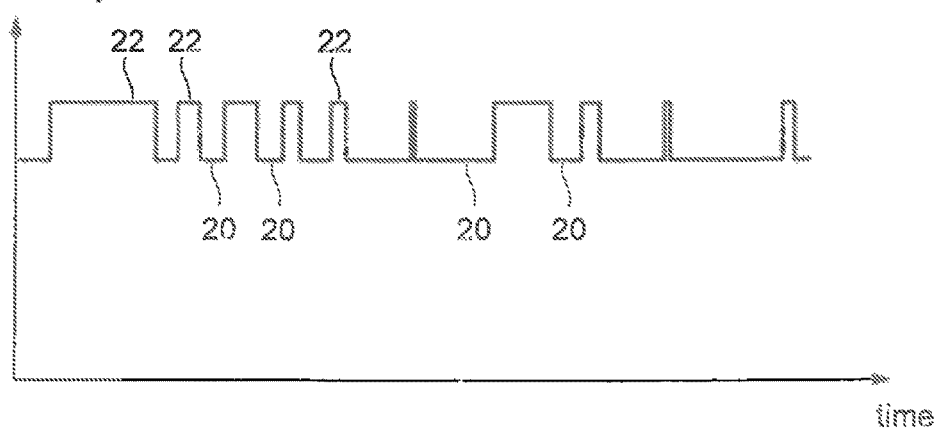
FIG. 2 shows an illustration of a light pattern at one point of the vehicle in motion when it travels along the road of FIG. 1.

The light pattern 24 illustrated in FIG. 2 is produced at a measuring point positioned at any desired point in the vehicle 18 when travelling on the road 10. When the measuring point passes through the areas 14 of low brightness, the light intensity at the measuring point is lower for this period of time (sections 20). When the measuring point passes through bright areas, the light intensity at the measuring point is correspondingly higher for this period of time (sections 22). The time duration of the sections 20, 22 is dependent on the width of the bright and, respectively, dark areas 14, 16 of the road and on the speed of the vehicle 18. Basically, as the speed increases, the sections 20, 22 become shorter.

Figure 3:
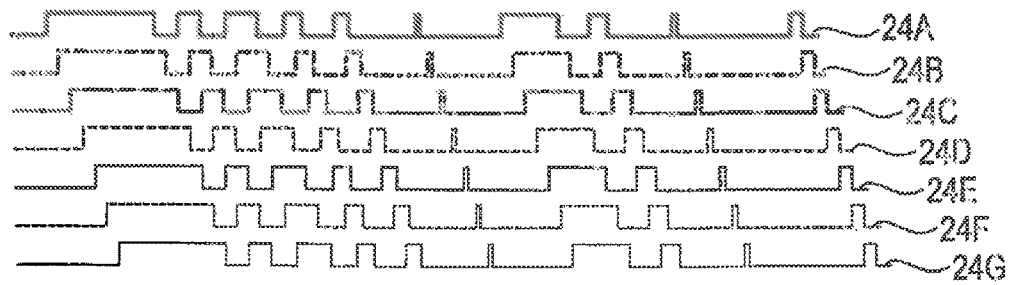
FIG. 3 shows a motion light pattern in a vehicle in motion when it travels along the road of FIG. 1.
Figure 4:
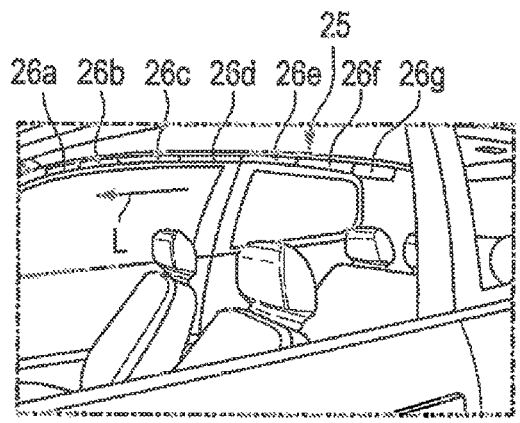
FIG. 4 shows an interior lighting according to the invention.

FIG. 3 shows a motion light pattern which is composed of the light patterns 24A-24G of different measuring points which are arranged evenly distributed in the vehicle 18 in the longitudinal direction of the vehicle 18. As can be seen in FIG. 3, the course of the light patterns 24A-24G is approximately the same since the measuring points pass through the same dark and bright areas 14, 16. A small variation may occur in the case of a tree-lined road, for example, by the motions of the trees, which may result in a slightly altered bright/dark pattern.

But since the measuring points are arranged offset in the direction of travel, they enter a bright or a dark area offset in time, so that the light patterns at the individual points A through G are offset in time with respect to each other. This time offset is thus dependent on the speed of the vehicle 18.

Since both the light pattern at a particular measuring point, that is, the time duration of the dark sections 20 and the bright sections 22, and also the light pattern composed of a plurality of light patterns 24A-24G are dependent on the speed of the vehicle 18, such a light distribution pattern makes it easier for a driver to assess the speed of the vehicle 18.

On the other hand, these strong changes of light make it difficult for the driver to concentrate on the traffic and on the road. The invention is based on the idea of damping these natural changes of light, so that the driver is not or at least less distracted by them. The natural motion light pattern is detected by a sensor and the lamps are driven such that they are switched on in dark areas 14 and/or switched off in bright areas 16, as a result of which the changes in brightness are lessened for the driver.

Figure 5:
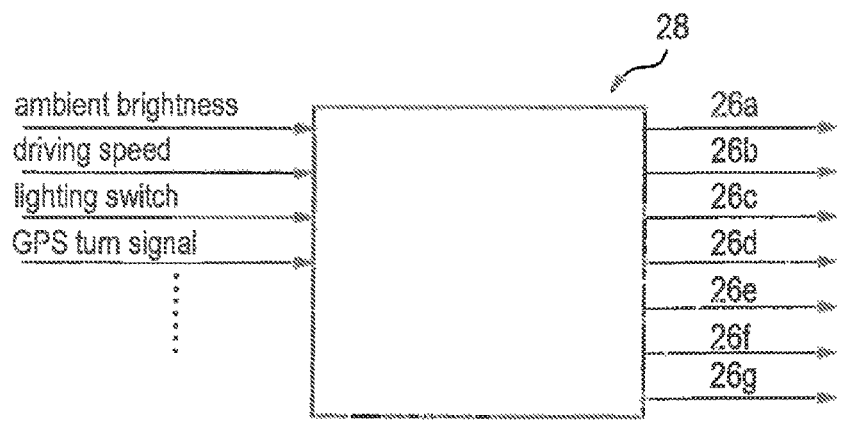
FIG. 5 shows a schematic representation of the controller of the interior lighting of FIG. 3.

The interior lighting 25 includes a plurality of lamps 26a through 26g which, in the embodiment shown here, are arranged one behind the other in the longitudinal direction L of the vehicle. The interior lighting 25 further includes at least one sensor (not shown here) for acquiring ambient data, that is, the ambient brightness outside of the vehicle, and a controller 28 schematically illustrated in FIG. 5.

The controller 28 can drive the lamps 26a through 26g separately from each other, the controller 28 being adapted to control the luminous periods, luminous pauses, and the luminous intensity of the individual lamps 26a through 26g.

Furthermore, the controller 28 can take up and/or process ambient data such as the ambient brightness or respective changes in brightness.

The controller 28 drives the individual lamps 26a through 26g separately from each other as a function of the ambient brightness measured.

By suitably selecting the luminous period and/or the off period of the individual lamps 26a through 26g and an offset in time when driving the individual lamps 26a through 26g, the controller 28 generates a motion light pattern in the vehicle which acts contrary to the natural motion light pattern illustrated in FIG. 3 that occurs when traveling on a road 10 through a wooded area.

This means that when the lamps 26a through 26g are located in a dark area 16, the lamps 26a through 26g are switched on. When the lamps 26a through 26g are located in a bright area 14, they are switched off.

This damps the bright/dark changes in the vehicle interior since the brightness in the dark areas 16 in the vehicle interior is adjusted to the brightness in the bright areas 14 by the lamps 26a through 26g. The driver, or the driver's eyes, therefore need not get accustomed to the constant light changes, so that the driver's tiredness is delayed and he/she is less distracted and can better concentrate on the traffic and on the road.

In addition, the motion light pattern or also a variation in the motion light pattern can bring about a stimulation of the driver's brain that can counteract a tiredness of the driver.

The light pattern of the individual lamps 26a through 26g may be a periodically recurrent light pattern. The luminous periods and the off periods of the individual lamps 26a through 26g may, however, vary within a defined range, for instance by a random control, so as to counteract any habituation effect and/or to make the motion light pattern appear more natural.

Figure 6:
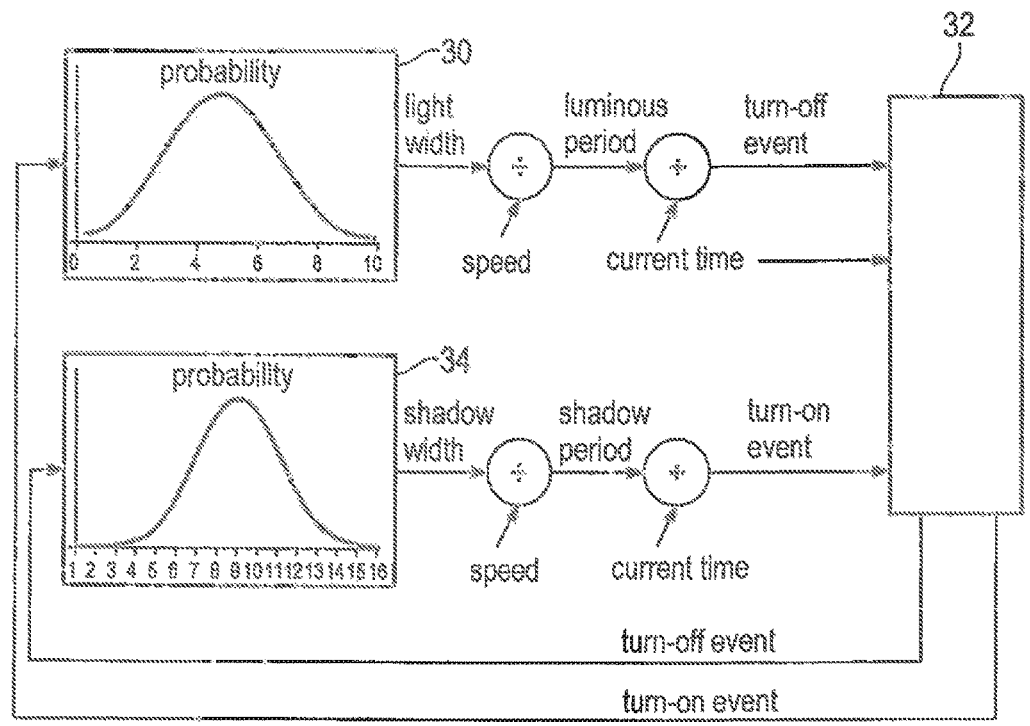

A method of driving the lamps 26a through 26g is illustrated by way of example in FIG. 6 by means of a lamp 26a. In a first step, a probable light width of a bright area 18 is generated by means of a random number generator 30. By dividing this light width by the current speed of the vehicle 18, the luminous period of the lamp 26a is calculated. The luminous period is added to the current time and thus the point in time is determined at which the lamp 26a is switched off, i.e. the simulated entry into a dark area 14 occurs. This value is stored in a time-controlled memory 32.

This memory 32 performs a continuous comparison of the time values of the stored events with the current time and, when the comparison is appropriate, it causes the lamp to be switched on or switched off.

Subsequently, a second random number generator 34 generates a value for a probable shadow width of the area 14. This shadow width is divided by the speed of the vehicle 18, and thus the time duration of switching the lamp 26a off is established. An addition to the current time results in the point in time at which the vehicle exits the simulated shadow and the lamp 26 is switched on again.

Then this process is repeated.

Figure 7:
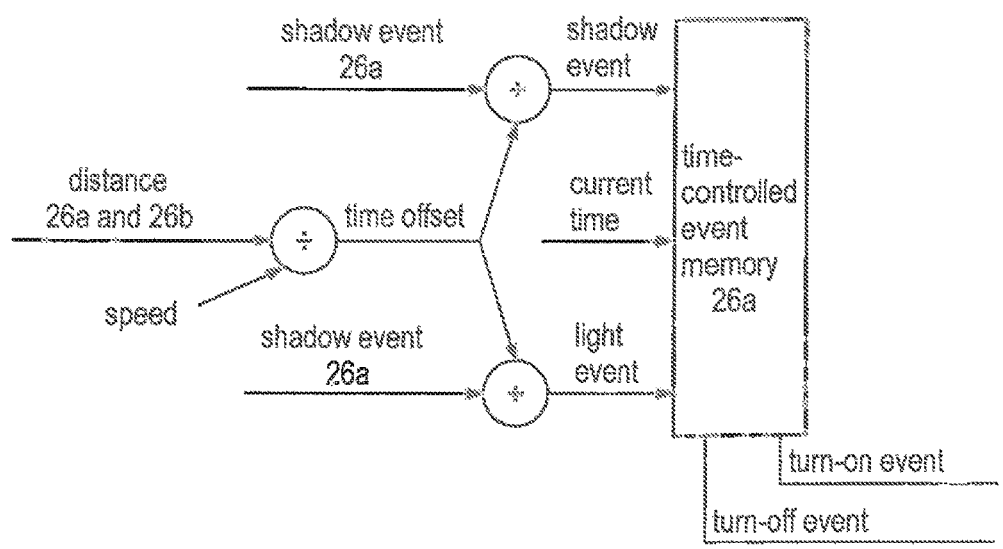
FIG. 7 shows the drive method for a further light source of the interior lighting of FIG. 3.

The driving of two neighboring lamps 26a, 26b is illustrated schematically in FIG. 7. The distance between the lamps 26a, 26b is divided by the speed of the vehicle, which results in the time offset between the light patterns of the individual lamps 26a, 26g. The turn-on times and turn-off times, offset in time, for the individual lamps 26a, 26g are thereby calculated, and they are stored in the memory 32.

The turn-on times and turn-off times are compared to the actual time. If the actual time corresponds to the turn-on time or turn-off time established, the corresponding event is triggered for the respective lamp 26a, 26b.

In the embodiment shown here, the lamps 26a through 26g are arranged in the longitudinal direction L of the vehicle. This allows light changes in the longitudinal direction of the vehicle to be damped.

Furthermore, it is also possible for the lamps 26a through 26g to be arranged in the vehicle in the transverse direction, thus allowing a damping of the bright/dark changes also in the case of light changes transversely to the direction of travel.

In the embodiment shown here, the lamps 26a through 26g are arranged on the inside roof lining of the vehicle 18. But it is also conceivable that they are arranged at a different location in the vehicle, for instance at the vehicle floor.

The lamps 26a through 26g may illuminate the interior directly, for example; but it is conceivable that they illuminate the interior indirectly by reflection, so as to prevent the vehicle occupants from being dazzled.

The lamps 26a through 26g are LEDs, for example, which allow a large-area illumination of the interior. Preferably, they are dimmable so as to allow an adaptation of the brightness of the light patterns 26a through 26g to the brightness outside or inside the vehicle, for example. But the driver can also adjust the brightness of the light pattern himself/herself, for example by means of an operating unit. If the lamps 26a through 26g are dimmable, this additionally allows a slow transition between luminous phases and dark phases, which is more pleasing to the driver. This may be effected by a sinusoidal course between brightness and darkness, for example.

The controller 28 may include a memory, for instance, in which respective motion light patterns are saved for different operating conditions of the vehicle. It is also conceivable that the controller 28 precalculates the motion light pattern or the light patterns for the individual lamps 26a through 26g and, in doing so, resorts to route data of a GPS, for instance.

The interior lighting may also be switched on for a longer period of time to use it in the vehicle for some other purpose, for example for reading. It is also conceivable that the controller determines the number of the vehicle occupants, and the lamps 26a through 26g are driven only in those areas where vehicle occupants are present.

The invention claimed is:

1. A method of controlling an interior lighting (25) in a vehicle (18), comprising a plurality of separately drivable lamps (26a-26g), wherein a motion light pattern including a wave pattern is generated as a function of vehicle operating data by separately driving the individual lamps (26a-26g), wherein the vehicle operating data includes ambient data picked up by a light sensor.

2. The method according to claim 1, wherein a substantially periodically recurrent light pattern is generated in which a period of the light pattern has a defined variance.

3. The method according to claim 1, wherein all of the lamps (26a-26g) are driven with an identical or similar wave pattern, the lamps (26a-26g) being driven with the wave pattern offset in time.

4. The method according to claim 1, wherein the lamps (26a-26g) are driven offset in time in a longitudinal direction (L) of the vehicle along a direction of travel, so that the motion light pattern runs in the longitudinal direction of the vehicle.

5. The method according to claim 1, wherein the lamps (26a-26g) are driven offset in time in a transverse direction of the vehicle, so that the motion light pattern runs in the vehicle transverse direction of the vehicle.

6. The method according to claim 3, wherein the offset in time with which the lamps (26a-26g) are driven is dependent on a driving speed of the vehicle.

7. The method according to claim 3, wherein the offset in time with which the lamps (26a-26g) are driven is dependent on an acceleration of the vehicle in a longitudinal direction and/or in a transverse direction.

8. The method according to claim 1, wherein the vehicle operating data is stored in a memory.

9. The method according to claim 1, wherein the wave pattern is dependent on a driving speed of the vehicle.

10. The method according to claim 1, wherein the wave pattern is dependent on an acceleration of the vehicle in a longitudinal direction and/or in a transverse direction.

11. An interior lighting (25) for a vehicle (18), comprising at least two lamps (26a-26g) which can be driven separately, and a controller (28) which can drive the lamps (26a-26g) separately, wherein the lamps (26a-26g) are driven by a method according to claim 1, and that at least one sensor is provided for acquiring vehicle operating data.

12. The interior lighting according to claim 11, wherein a memory (32) for the vehicle operating data is provided.

13. The interior lighting according to claim 11, wherein the lamps (26a-26g) are arranged in a longitudinal direction (L) of the vehicle and/or in a transverse direction of the vehicle.

14. The method according to claim 1, wherein the light sensor detects ambient brightness outside the vehicle and generates a natural motion light pattern, a controller generating the motion light pattern in the lamps that is contrary to the natural motion light pattern.

15. The method according to claim 1 further comprising:
   correlating a predetermined motion light pattern with route data for a distance of road;
   storing the correlation in memory; and
   retrieving the predetermined motion light pattern from the memory when the vehicle subsequently moves through the distance of road.

16. A method for controlling interior lighting in a vehicle comprising:
   providing a plurality of separately drivable lamps within the vehicle;
   detecting vehicle operating data including ambient data outside the vehicle using a light sensor; and
   generating a motion light pattern in the drivable lamps as a function of the vehicle operating data.

17. The method according to claim 16 further comprising detecting a driving speed of the vehicle, the motion light pattern in the drivable lamps being generated as a function of the driving speed and the ambient data outside the vehicle.

18. The method according to claim 16, wherein the light sensor detects ambient brightness outside the vehicle and generates a natural motion light pattern, a controller generating the motion light pattern in the lamps that is contrary to the natural motion light pattern.

19. The method according to claim 16 further comprising:
   correlating a predetermined motion light pattern with route data for a distance of road;
   storing the correlation in memory; and
   retrieving the predetermined motion light pattern from the memory when the vehicle subsequently moves through the distance of road.

20. The method according to claim 1, wherein the light sensor detects ambient brightness outside the vehicle and generates a natural motion light pattern having a plurality of different light intensities over a distance of road, the motion light pattern generated in each of the lamps being contrary to the natural motion light pattern.

* * * * *